United States Patent [19]
Minnis

[11] Patent Number: 5,145,356
[45] Date of Patent: Sep. 8, 1992

[54] ELECTRICAL CONNECTOR HOUSINGS

[75] Inventor: Alan J. Minnis, London, United Kingdom

[73] Assignee: AMP Incorporated, Harrisburg, Pa.

[21] Appl. No.: 706,829

[22] Filed: May 29, 1991

[30] Foreign Application Priority Data

May 30, 1990 [GB] United Kingdom ............... 9012060

[51] Int. Cl.$^5$ .................................. H01R 13/627
[52] U.S. Cl. ................................... 439/352; 439/489; 439/372
[58] Field of Search ............... 439/345, 357, 358, 369, 439/372, 596, 489

[56] References Cited

U.S. PATENT DOCUMENTS

| | | | |
|---|---|---|---|
| 4,564,252 | 1/1986 | Kato et al. | 439/358 |
| 4,607,903 | 8/1986 | Hoshino et al. | 439/370 |
| 4,674,814 | 6/1987 | Hoshino et al. | 439/372 |
| 4,750,893 | 6/1988 | Sueyoshi et al. | 439/596 |
| 4,767,361 | 8/1988 | Hoshino et al. | 439/596 |
| 4,867,705 | 9/1989 | Yuasa | 439/596 |
| 4,884,978 | 12/1989 | Inaba et al. | 439/350 |
| 4,938,710 | 7/1990 | Aihara et al. | 439/345 |

FOREIGN PATENT DOCUMENTS 3544180  6/1986  Fed. Rep. of Germany ...... 439/596

Primary Examiner—Larry I. Schwartz
Assistant Examiner—Hien D. Vu
Attorney, Agent, or Firm—Bruce J. Wolstoncroft; William B. Noll

[57] ABSTRACT

A pair of matable electrical connector housings (30 and 62) comprise a pair of longitudinally spaced locking ribs (52 and 54) on one housing (30) and a channel member (102) on the other housing (62) for receiving the locking ribs (52 and 54) as the housings (30 and 62) are being mated. The channel member (102) has an opening (108) for receiving a locking member (112) on a flexible arm (110) formed integrally with a side (100) of the housing (62). The arm (110) can be flexed to insert the locking member (112) through the opening (108) in the channel member (102) so that the locking member (112) is wedged therein so as to retain the housings (30 and 62) locked in a fully mated condition. Unless the ribs (52 and 54) have been fully inserted into the channel member (102), the housings (30 and 62) being then in a fully mated condition, the locking member (112) cannot be inserted through the opening therein. The position of the locking member (112) provides a visual indication as to whether or not the housings (30 and 62) have been fully mated.

11 Claims, 10 Drawing Sheets

ELECTRICAL CONNECTOR HOUSINGS

BACKGROUND OF THE INVENTION

This invention relates to a pair of mating electrical connector housings having means for locking them in fully mated relationship and to an electrical connector insulating housing comprising a part of said locking means.

There are environments in which it is essential to be certain that the two parts of a bipartite electrical connector has been fully mated. One of these environments is, for example, where the connector is to be used for the connection of electrical actuators of air bags in an automotive air bag deployment system, to automotive crash sensors of the system. In such a case, where the air bags have been removed from the system, for example for testing or servicing, it is essential when replacing the air bags to be certain that the housings of the bipartite connector have been fully mated so that the actuators are armed. The present invention concerns means for ensuring that the housings of bipartite electrical connectors have been fully mated, such means providing a visual indication that the housings have been so mated.

SUMMARY OF THE INVENTION

According to a preferred aspect of the invention, the invention consists of a pair of matable electrical connector housings having means for locking them in fully mated relationship, the locking means comprising a pair of longitudinally spaced locking ribs on one housing and a channel member on the other housing for receiving said locking ribs as the housings are being mated, the channel member having an opening for receiving a locking member flexibly connected to said other housing externally thereof, for snug reception between said locking ribs only in the fully mated condition of the housings to lock them in their fully mated relationship. However, since the locking member can only be inserted between the ribs when the housings have been fully mated, it can readily be determined by inspection, whether or not the externally connected locking member has, or has not, been so inserted. Conveniently, the locking member is so formed that it is wedged in the channel member when it has been received between the locking ribs. Also, said other housing is preferably provided with means for guiding the locking ribs into the channel member.

According to another aspect thereof, the invention consists of an electrical connector insulating housing comprising a plurality of terminal receiving cavities extending between a mating face and an opposite face of the housing, a pair of parallel, spaced channel members supported in spaced relationship with respect to an external wall of the housing and extending from said mating face towards said opposite face, each channel member having laterally inner and outer side walls, and outer side walls and roof, cooperating to define a channel and having an open side facing said external wall and an open end at least proximate to said mating face, the roof of each channel member having formed therein an opening spaced back from said mating face towards said opposite face, an end of said opening nearest to the mating face being blind, locking wedge members each associated with a respective one of said channel members each being connected to said housing between said mating face and said opposite face by means of an arm, each arm being capable of flexure to insert the locking member thereon through the opening of the channel member associated therewith, and to wedge it in the channel of that member.

For a better understanding of the present invention and to show how it may be carried into effect, reference will now be made by way of example to the accompanying drawings.

DETAILED DESCRIPTION OF THE PREFERRED EMBODIMENT

Figure 1:
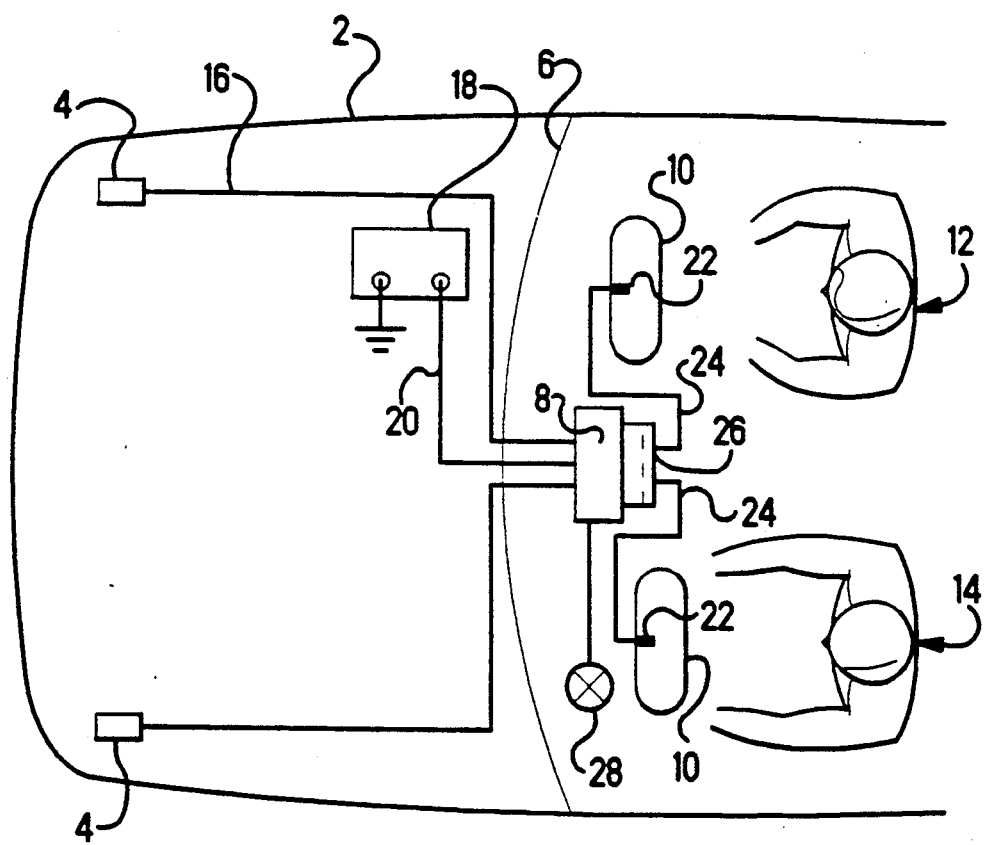
FIG. 1 is a schematic diagram of an automotive air bag deployment system in situ, comprising a bipartite electrical connector providing an interface between a diagnostic unit and a pair of air bags of the system.

As shown in FIG. 1, an air bag deployment system assembled to the forward part 2 of an automotive vehicle, comprises a pair of crash sensors 4, disposed forwardly of the fire wall 6 of the vehicle, a diagnostic unit 8 disposed rearwardly of the wall 6 and two air bags 10 arranged before the driver's seat 12 and the front passenger seat 14, respectively, of the vehicle. The sensors 4 are connected to the diagnostic unit 8 by way of lines 16 each comprising a ground lead and a pair of signal leads. The battery 18 of the vehicle is also connected to the unit 8 by way of a line 20. Each air bag 10 has an electric actuator in the form of a squib 22 which is actuable to inflate the air bag 10, each squib 22 being connected to the diagnostic unit 8 by way of a line 24 and a bipartite interface connector 26 which is described in detail below. Each line 24 comprises two signal leads for transmitting ignition current generated by the unit 8 in response to actuation of a sensor 4, to the respective squib 22, to activate it and a test lead. In practice, the connector 26 will be incorporated in the diagnostic unit 8. Where the parts of the connector 26 are in an unmated condition, for example, where one or other of the squibs 22 is to be removed, for example for testing purposes, a warning lamp 28 of the unit 8 is automatically illuminated to indicate that the air bags 10 are no longer in circuit.

It is a disadvantage of air bag deployment systems, that as explained in the foregoing, the squibs, which are necessarily very sensitive, can be triggered off when they have been disconnected from the diagnostic unit, for example, by leakage or other fortuitous, or accidentally applied currents. The connector 26 is, as explained in detail below, constructed for the avoidance of this disadvantage.

Figure 7:
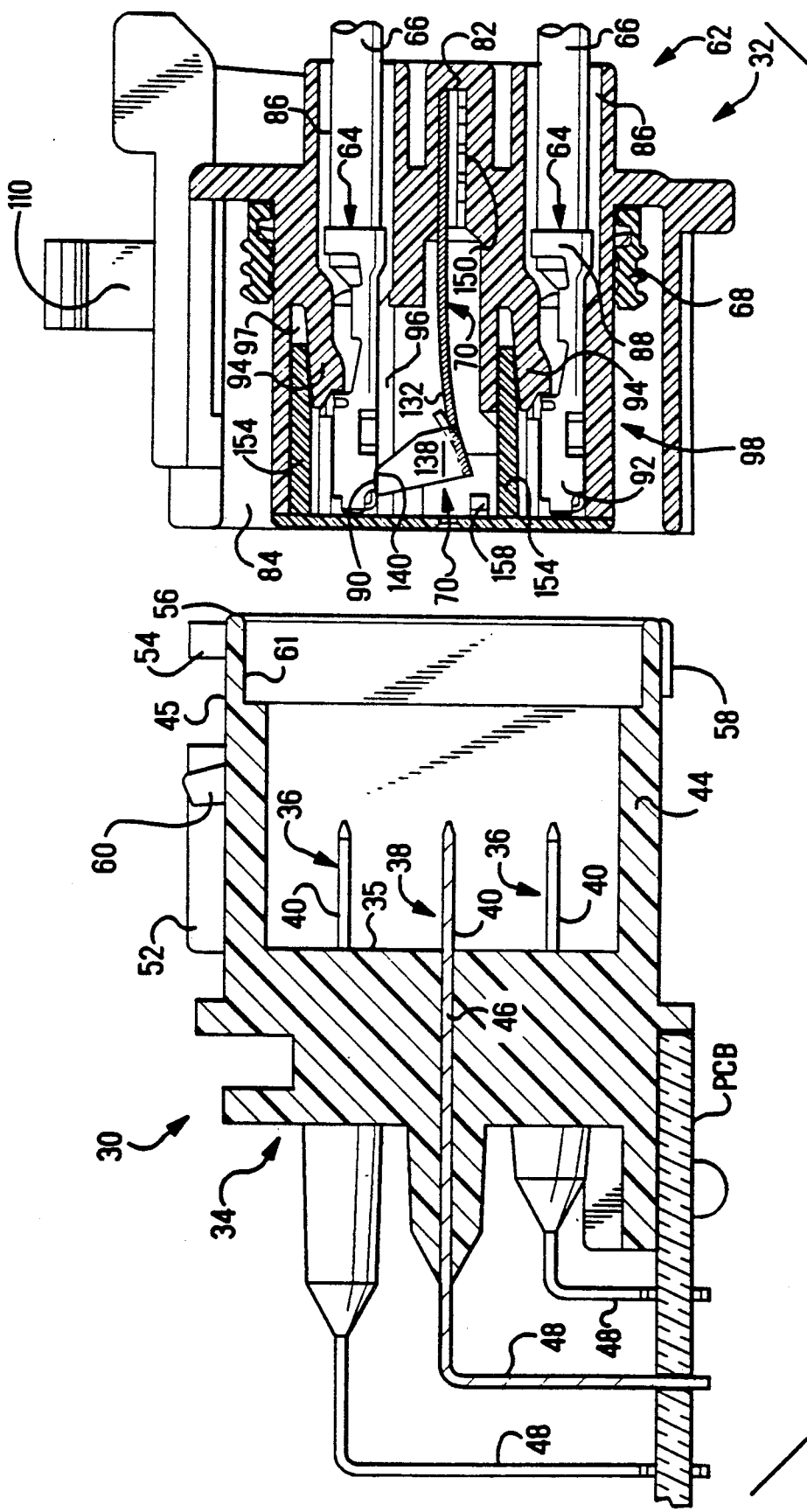
FIG. 7 is a longitudinal sectional view showing the receptacle part in a fully assembled condition and about to be mated with a pin header part of the bipartite connector.
Figure 8:
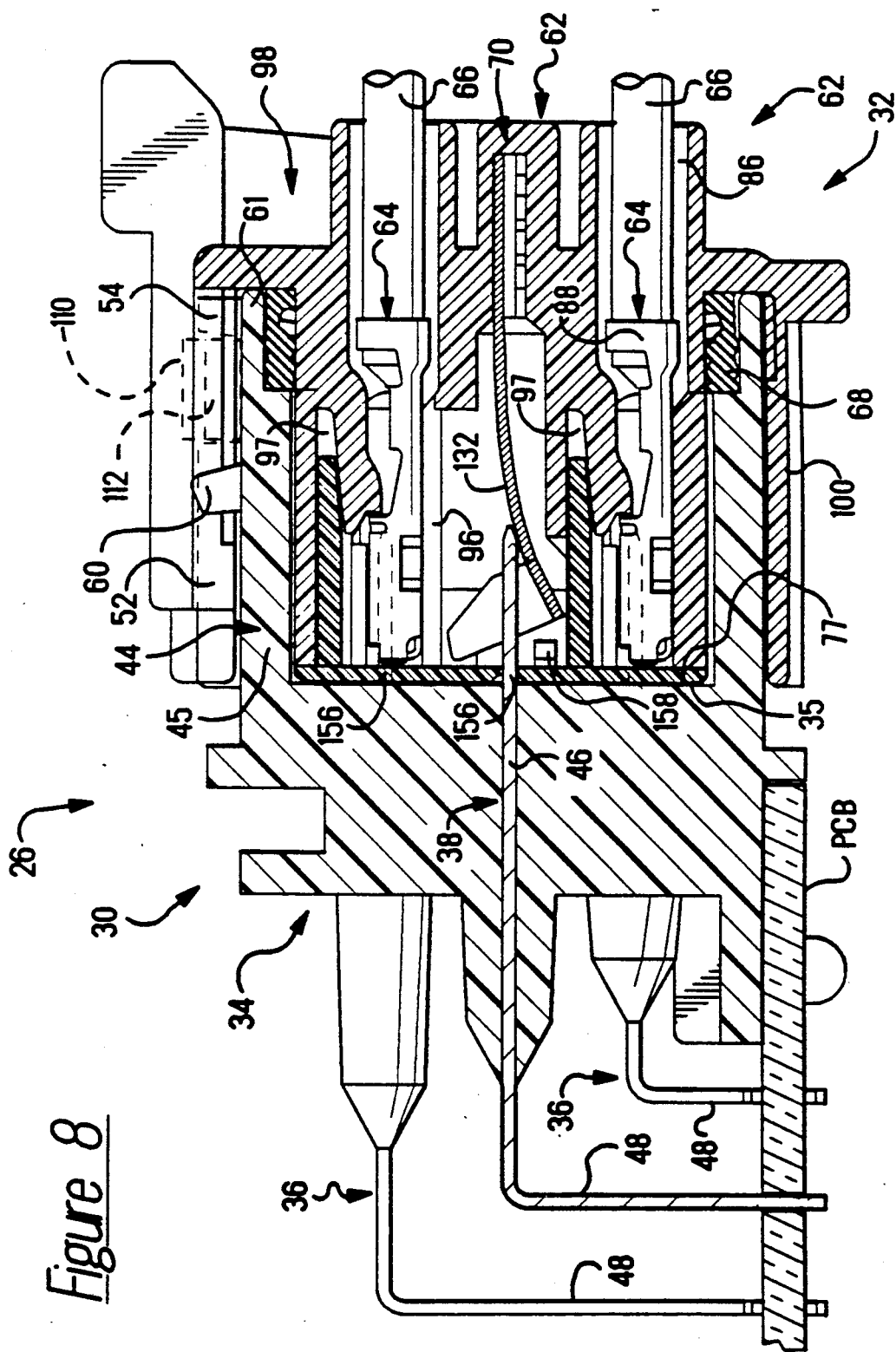
FIG. 8 is a longitudinal sectional view showing the receptacle part mated with the header part.

The bipartite interface connector 26 comprises a pin header part 30 which, as shown in FIGS. 7 and 8 is surface mounted to a printed circuit board PCB of the diagnostic unit 8, and a receptacle part 32 for mating with the part 30 and having at two spaced pairs of positions therein, electrical terminals connected to the signals leads of the squibs 22, and at other positions therein, terminals connected to the test leads of the squibs 22 and terminals connected by leads (not shown in FIG. 1) to fault read out means for the diagnostic unit 8. The connector 26 serves to connect twelve leads in all to the diagnostic unit 8, three leads for each squib 22 and six other leads.

The pin header part 30, which is of rectangular cross section, comprises a one piece, molded, insulating block 34 in which are mounted twelve active electrical pins 36 and two pairs of actuator pins 38, all of the pins being of identical dimensions and each having a rectilinear mating section 40 having a chamfered free end 42 projecting into, and being surrounded by, a rectangular cross section peripheral hood 44 defining a socket and extending forwardly from the block 34 from a mating face 35 thereof and being formed integrally therewith. Each pin 36 and 38 further comprises a transition section 46 extending rearwardly through the block 34 and a tail 48 bent down at right angles to the section 46, to project below, and behind, the block 34. The tail 48 of each pin 36 extends through a hole in the circuit board PCB and is soldered to a respective printed conductor on the underside thereof, whereas the tail 48 of each pin 38, which also extends through a hole in the board PCB is not connected to any circuitry thereon, or, indeed, to any other circuitry, as shown in FIGS. 7 and 8.

Figure 12:
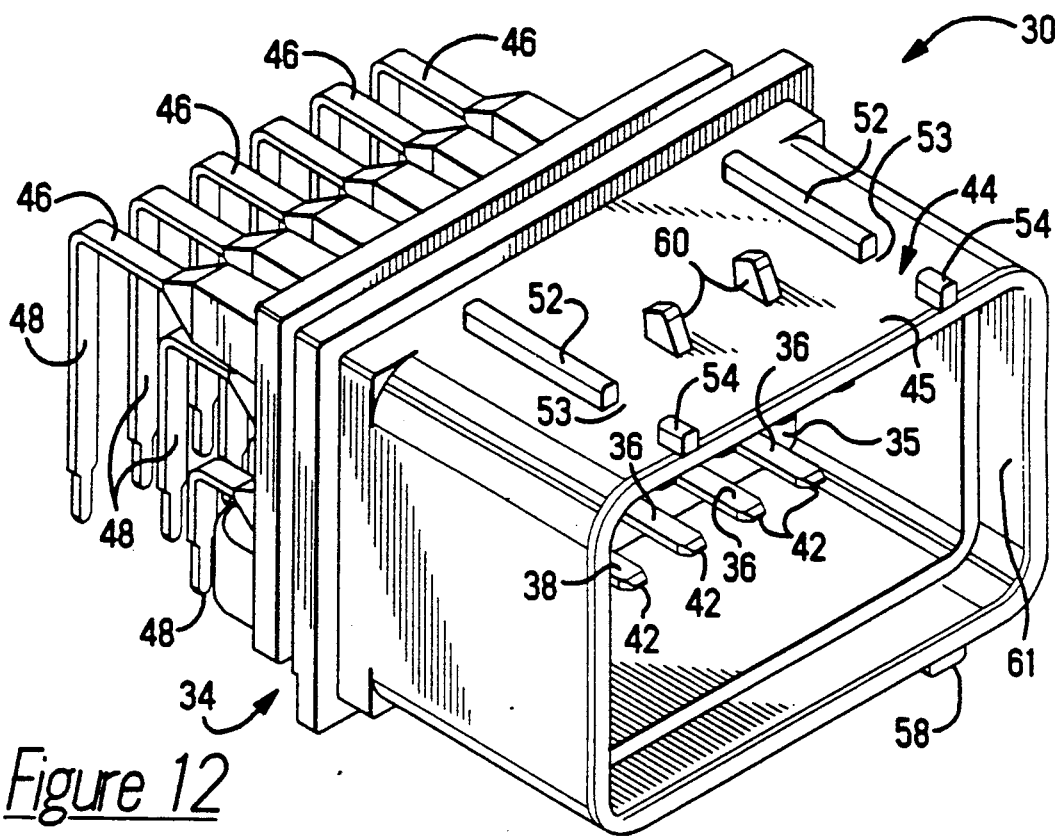
FIG. 12 is an enlarged isometric view of the pin header part of the connector.
Figure 13:
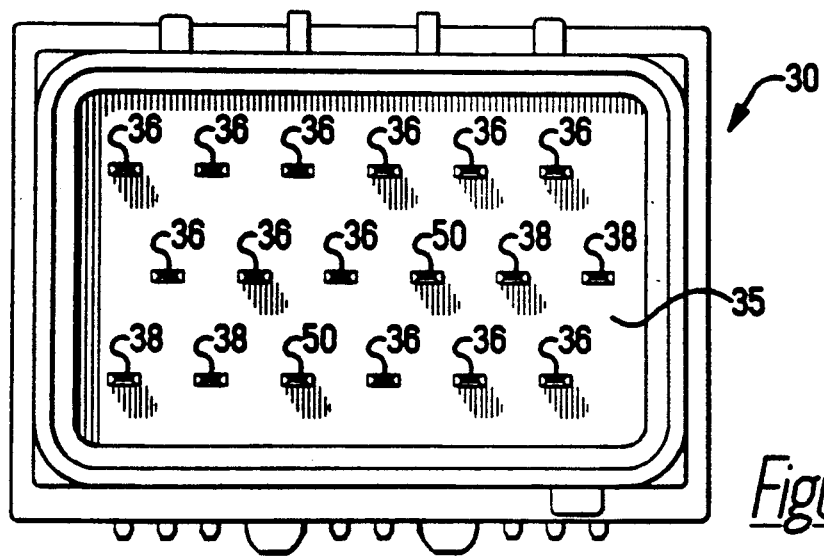
FIG. 13 is a diagrammatic front view of the pin header part illustrating the arrangement of pins therein.

As best shown in FIG. 13, the pins 36 and 38 are arranged in three parallel superposed rows, there being 6 pins 36 in the top row, 3 pins 36 in the middle row, 3 pins 36 in the bottom row, 2 pins 38 in the middle row and 2 pins 38 in the bottom row. There are two redundant pins 50, in the middle and bottom rows. The pins 38 are arranged in two pairs, one pair being disposed on each side of the pins 50. As best seen in FIG. 12, there project from the upper wall 45 of the hood 44, two laterally spaced pairs of longitudinally aligned locking ribs 52 and 54, the rib 52 of each pair being substantially longer than the rib 54 thereof and the ribs 52 and 54 of each pair being spaced from one another longitudinally of the pin sections 40 and 46, that is to say in their longitudinal direction. The ribs 52 and 54 of each pair define a gap 53 between them. On the lower face of the hood 44 and proximate to its free edge 56, is a polarizing key 58. Between the ribs 52 is a pair of laterally aligned latching lugs 60. The hood 44 is formed at its forward end with an internal peripheral, seal receiving recess 61.

Figure 14:
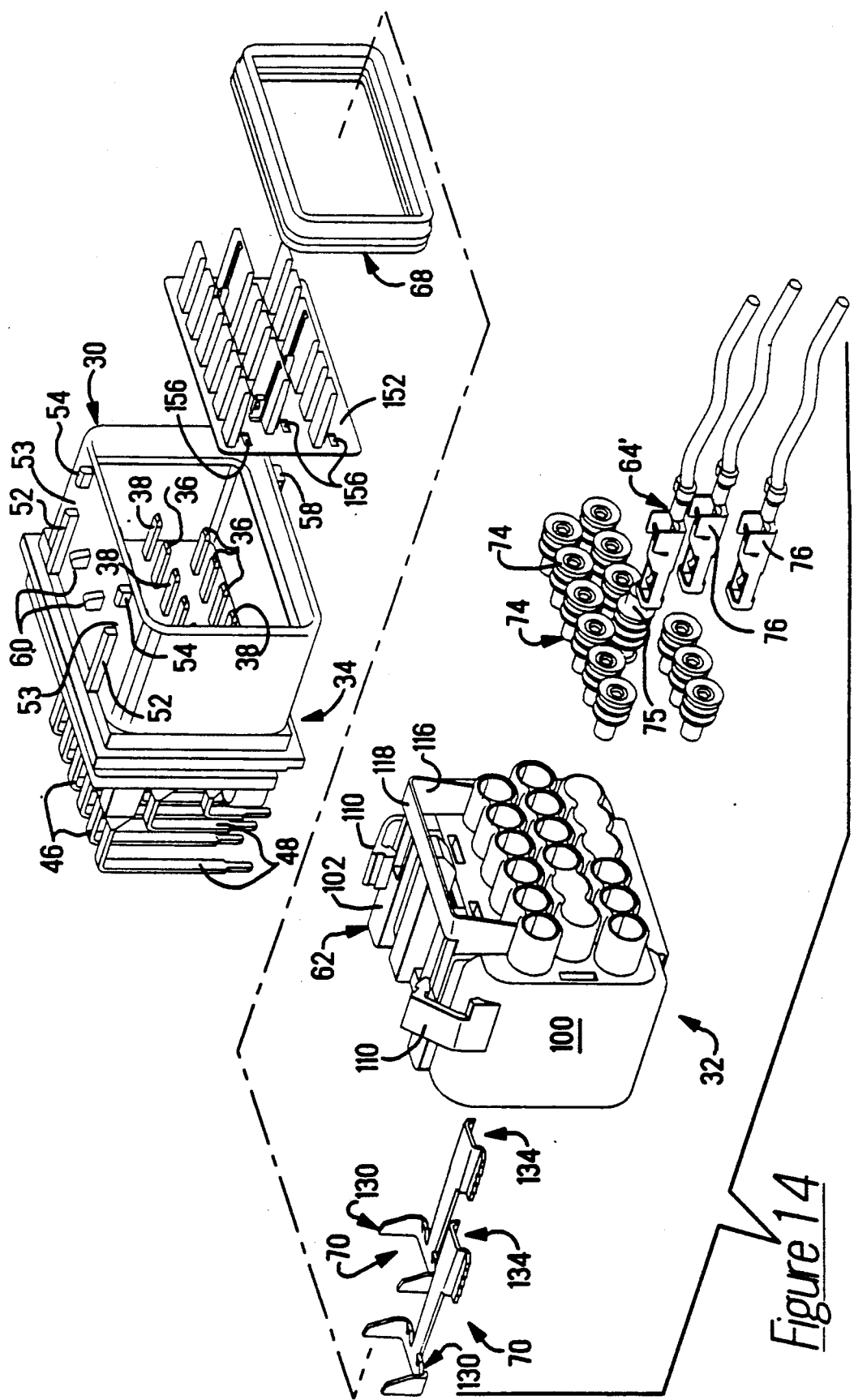
FIG. 14 is an exploded, isometric view of the bipartite connector when provided with bung seals for sealing electrical terminals of the receptacle part in cavities therein.

The receptacle part 32 comprises a one piece, molded insulating housing 62, twelve electrical receptacle terminals 64, only some of which are shown, crimped to insulated electrical leads 66, an annular peripheral seal 68, two short circuiting links 70, and an anti-backout insert 72. As shown in FIG. 14, the 30 terminals, all of which are referenced 64', may be provided with bung seals 74 and flanges 76 for crimping about the seals 74 to secure them to the terminals 64', and a blanking plug 75 may also be provided.

Figure 2:
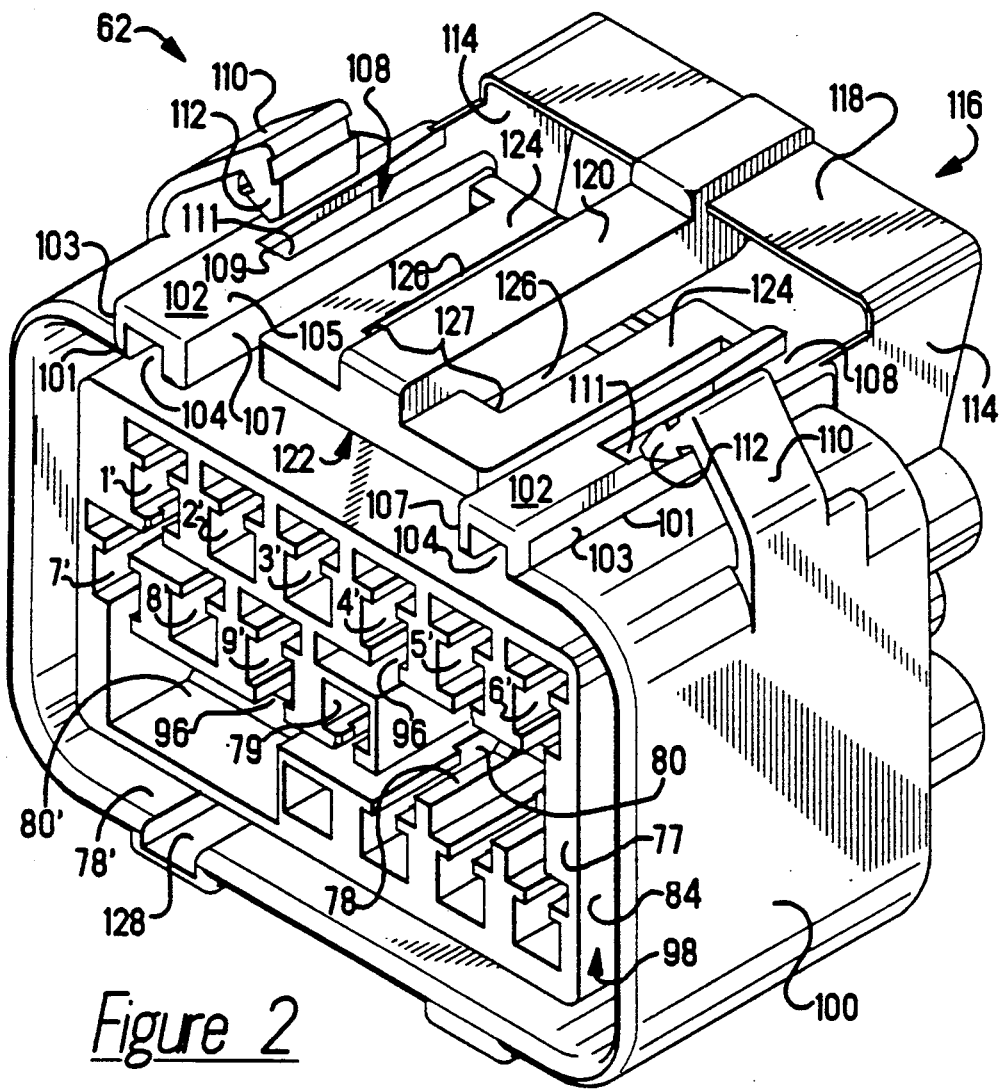
FIG. 2 is an enlarged isometric view of an insulating housing of a receptacle part of the bipartite connector.
Figure 3:
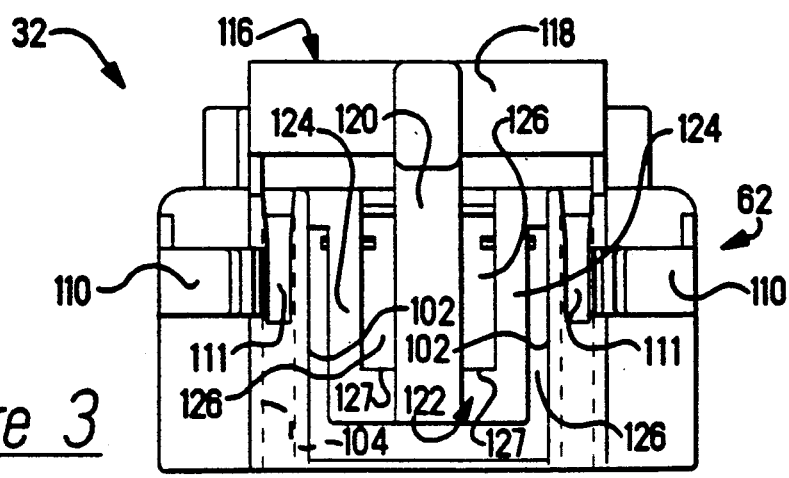
FIG. 3 is a fragmentary plan view of the housing shown in FIG. 2.
Figure 4:
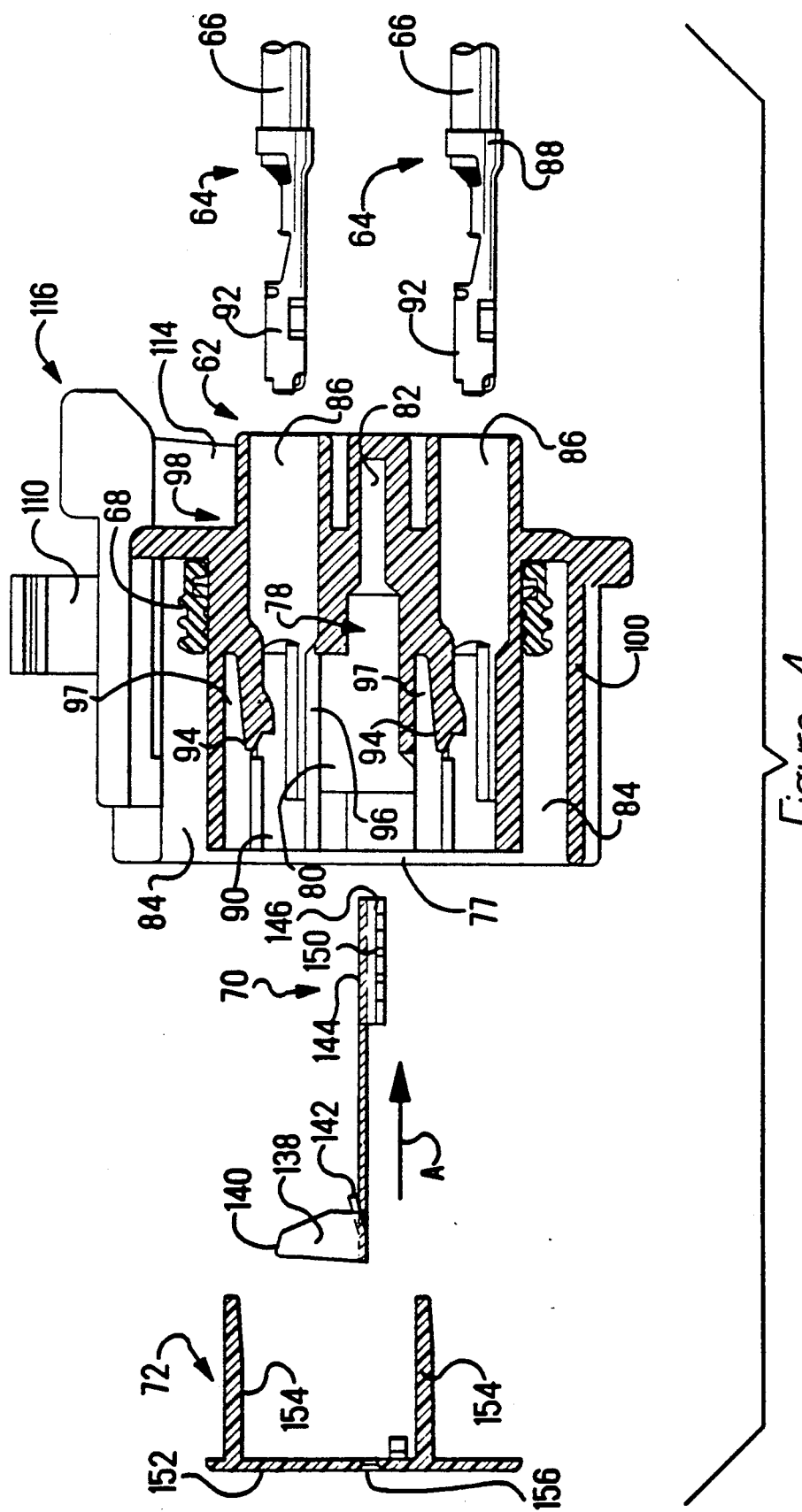
FIG. 4 is an exploded longitudinal sectional view of said receptacle part.
Figure 6:
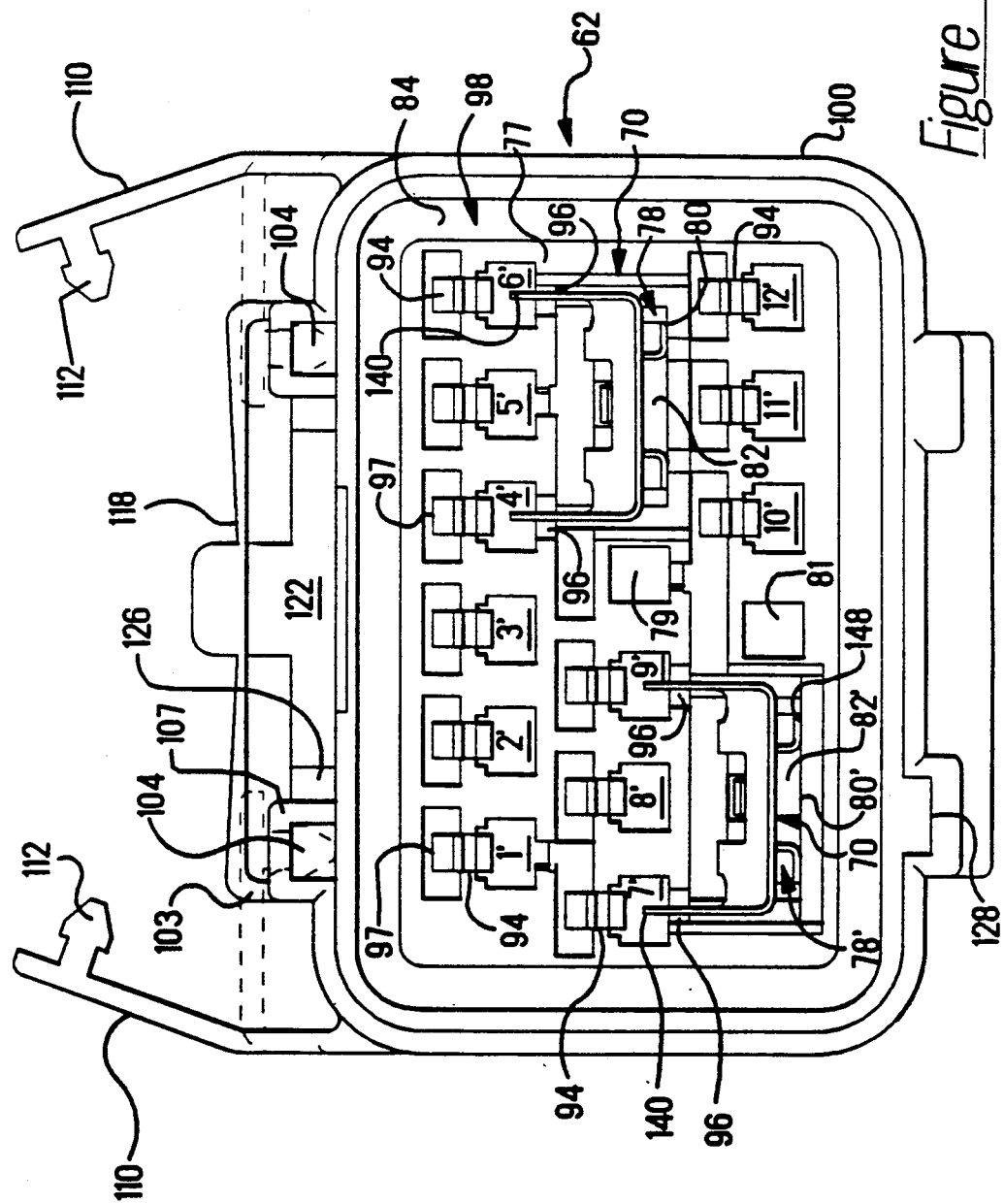
FIG. 6 is an enlarged front view of the housing as shown in FIG. 5, and showing both of said links.

As shown in FIGS. 2 and 6, the housing 62 has, opening into a mating face 77 thereof, an upper row of through cavities 1' to 6', a middle row of through cavities 7' to 9' and a low row of through cavities 10' to 12', each of the cavities 1' to 12' being dimensioned to receive one of the terminals 64. To the right, as seen in FIGS. 2 and 6, of the cavity 9' of the middle row, is a cavity 79 for receiving one of the pins 50 of the pin header part 30, and to the right of the cavity 79, is a blind socket 78, best seen in FIG. 4, comprising an enlarged forward portion 80 and a smaller cross section rear portion 82, for receiving one of the short circuiting links 70. A similar blind socket 78', having an enlarged forward part 80' and a smaller cross section rear part 82' is formed adjacent to a cavity 81 of the bottom row for receiving the other pin 50, but on the opposite side of the socket 79 to the socket 78. The socket 78' is for receiving the other short circuiting link 70. Around the mating face 77 thereof, the housing 62 has a recess for receiving the seal 68, as well as the hood 44 of the pin header part 30.

Each cavity 1' to 12' comprises a rear portion 86 for receiving part of a respective lead 66, a bung seal 74, where this is provided, and a crimped insulation barrel 88 of a terminal 64. Each cavity 1' to 12' has a forward portion 90 for receiving the receptacle 92 of the terminal 64. A latch arm 94 for retaining a terminal 64 in the cavity, projects from an internal wall of the housing 62 at the forward end of the cavity portion 86 of each cavity. The bottom of each of the cavities 4', 6', 7' and 9' is formed with a through slot 96. Each latch arm 94 defines, in cooperation with an adjacent wall of the housing 62, a recess 97.

Figure 9:
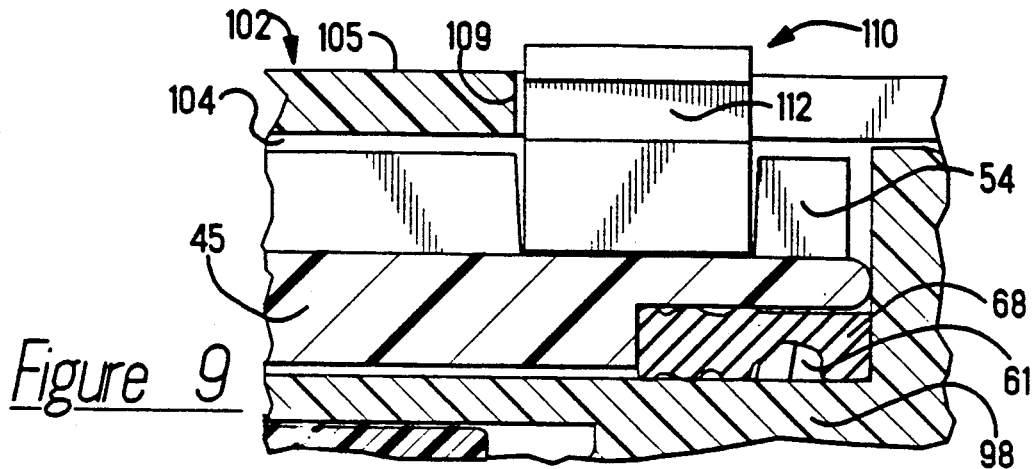
FIG. 9 is an enlarged, fragmentary, longitudinal sectional view showing details of FIG. 8.

The recess 84 is defined between a central block 98 of the housing 62, in which block the cavities and sockets just described are formed, and an outer wall 100 extending about the bottom wall of, and the two side walls of, the housing 62. The upper margins 101 of the wall 100 are each formed integrally with an outer side wall 103 of a respective channel member 102 having a roof 105 and an inner side wall 107. The side walls 103 and 107 and the roof 105 of each channel member 102 define a channel 104, the bottoms of the walls 103 and 107 being spaced from the block 84 in order to allow the upper wall 45 of the hood 44 of the pin header part 30 to pass between the walls 103 and 107 and the block 84. The rearward part of each roof 105 is formed with a longitudinal slot 108 which is blind at its forward end 109 and open at its rear end and which communicates with the respective channel 104. There extends from, and is formed integrally with, each upper marginal part of the outer wall 100, a resilient, cantilever locking arm 110 having at its free end an inwardly directed locking head 112 of arrow head-shaped cross section. Each arm 110 is depressible to engage its locking head 112 wedgingly in a reduced width portion 111 of the respective channel 104 by way of the slot 108, proximate to the blind end 109 of the slot 108, as best seen in FIG. 9. The outer wall 103 of each channel member 102 is formed integrally with a side wall 114 of a gantry 116, the walls 114 being formed integrally with the rear of the block 84. The gantry 116 has a cross piece 118 from which projects forwardly, a resilient cantilever support bar 120 with the free end of which is integrally formed a yoke 122 extending between the channel members 102 and having limbs 124 cooperating with the bar 120 to define through guide slots 126 each of which is open at its rear end and is blind at its forward end, terminating in a latching shoulder 127. The slots 126 extend parallel to the channels 104. The yoke 122 is spaced above the block 84 to allow the passage of the upper wall 45 of the hood 44 of the pin header part 30, between the yoke 122 and the block 84. The bottom of the wall 100 is formed with a keyway 128, which is shown in FIGS. 2 and 6, for receiving the key 58 of the pin header part 30.

Figure 10:
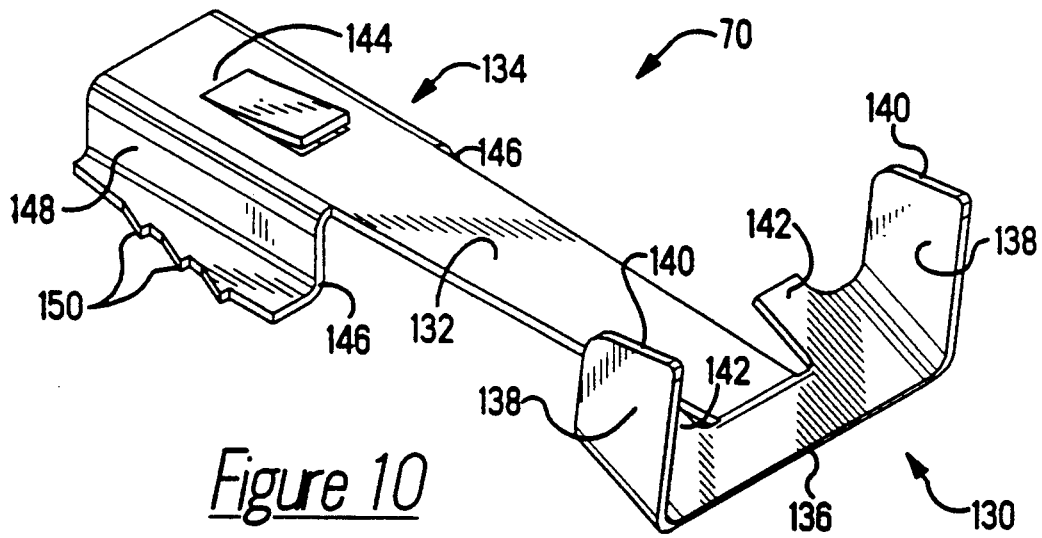
FIG. 10 is an enlarged isometric view of one of the short circuiting links.
Figure 11:
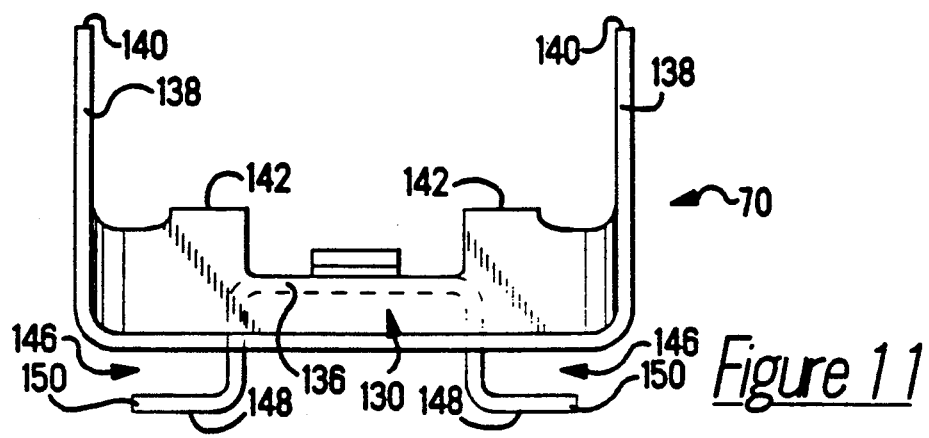
FIG. 11 is an end view of FIG. 10.

Each short circuiting link 70 which has been stamped and formed from a single piece of sheet metal stock, comprises, as best seen in FIGS. 10 and 11, a hammer head 130 at its forward end and which is connected by means of flat, rearwardly tapered beam 132, to a retention portion 134. The hammer head comprises a cross piece 136 from which the beam 132 extends centrally, and which has at each end thereof an upstanding contact lug 138 terminating at its free end in a contact surface 140. There projects rearwardly from the cross piece 136, between the beam 132 and each lug 138, an upwardly inclined, rectangular abutment ear 142. The retention portion 134 comprises a central part 144 which is coplanar with the beam 132 and from either side of which depends an anchoring flange 146 terminating in an outwardly projecting ear 148, the free lateral edge of which is formed with sharp ended, and forwardly directed, anchoring serrations 150.

The anti-backout insert 72, which is molded in one piece from an insulating material, comprises a rectangular base plate 152, from one side of which project normally thereof, as best seen in FIG. 14, three rows of anti-backout spigots 154, each for reception in a respective recess 97 of the housing 62. Proximate to the root of each spigot 154 is a rectangular hole 156 in the plate 152, for the passage therethrough, of the mating section 40 of a respective pin 36 or 38 as the case may be, of the pin header part 30. The plate 152 also has a central rectangular hole (not shown) for receiving the plug 50.

The assembly of the receptacle part 32 will now be described with reference to FIGS. 4 to 7 and 14. Firstly, one of the short circuiting links 70 is inserted, in the direction of the arrow A in FIG. 4 with its retention portion 134 leading, into the socket 78 of the housing 62, so that the portion 134 of the link 70 is received in the rear socket portion 82 of the socket 78, whereby the said one link 70 is anchored in the socket 78, by means of the serrations 150 on the portion 134 which engage the side walls of the socket portion 82 and bite thereinto, the remainder of the link 70 being received in the enlarged portion 80 of the socket 78 (FIG. 5), the other link 70 being similarly inserted into the socket 78'. When the links 70 have been so inserted, the contact surfaces 140 of the contact lugs 138 of said one link 70 are thus substantially aligned with the longitudinal axes of the respective cavities 4' and 6', the contact surfaces 140 of said other link 70 being substantially aligned with the longitudinal axes of the respective cavities 7' and 9', as shown in FIG. 6.

Figure 5:
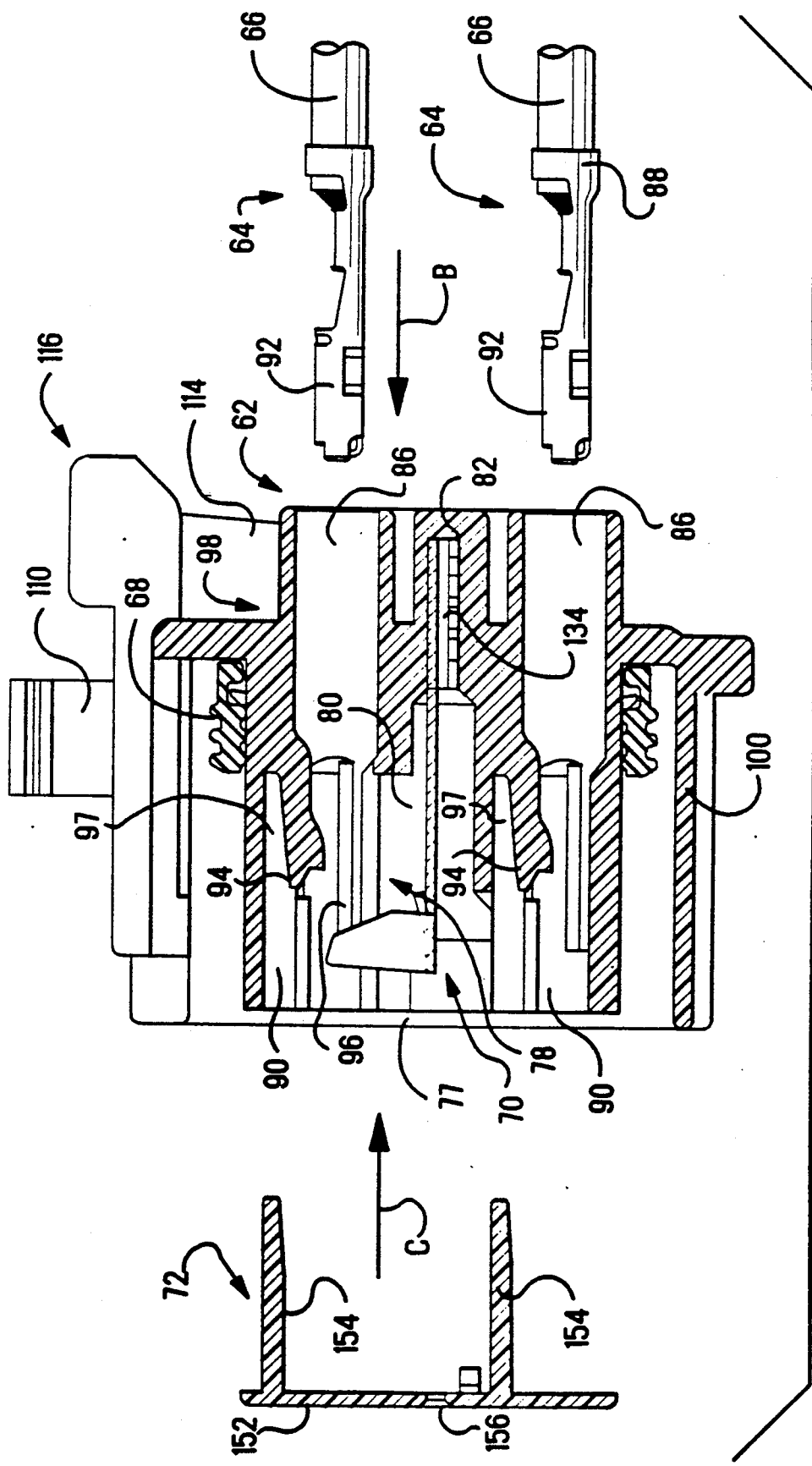
FIG. 5 is a similar view to that of FIG. 4 but showing one of a pair of short circuiting links assembled to the housing.

Secondly, the terminals 64 are each inserted into a respective cavity 1' to 12', in the direction of the arrow B in FIG. 5, by way of the rear face of the housing 62, so that, as shown in FIG. 7, the barrel 88 of each terminal 64 is received in the cavity portion 86, the receptacle 92 of that terminal resiliently displacing the respective latch arm 94 until the latter snaps back to lodge against the rear of the receptacle 92 to latch the terminal in its cavity as shown in FIG. 7. During the insertion of the terminals 64 into the cavities 4', 6', 7' and 9', the receptacles 92 of these terminals engage the contact surfaces 140 of the respective links 70 thereby resiliently displacing the beams 132 thereof as shown in FIG. 7 so that the surfaces 140 are engaged in firm electrical contact with the receptacles 92.

Lastly the anti-backout insert 72 is inserted into the housing 62 in the direction of the arrow C in FIG. 5 so that, as will be apparent from FIG. 7, each spigot 154 is received in a respective recess 97, thereby holding the respective latch arm 94 against the receptacle 92 of the respective terminal 64, so that it can, under no circumstances, back out from its cavity. Latch means 158 are provided for securing the insert 72 in its assembled position in the housing 62.

The leads 66 of the terminals 64 in the cavities 4' and 6' are the said signal leads of one of the lines 24 connected to one of the squibs 22, the leads 66 of the terminals 64 in the cavities 7' and 9' being the said signal leads of the other line 24, when the leads in question have been connected to the respective squibs 22. The leads of the terminals 64 in two other of the cavities constitute the test leads of the squibs 22 and the leads 66 of the terminals 64 in the remaining cavities are connected to the said fault read-out means of the diagnostic system.

Since the leads 66 of the terminals 64 the cavities 4' and 6' are short circuited by the upper link 70, the leads of the terminals 64 in the cavities 7' and 9' being short circuited by the lower link 70, no accidental or fortuitous energization of these leads can occur, so that neither of the squibs 22 can be fired.

When the receptacle 32 of the bipartite connector 26 is mated with the pin head 30 thereof, as shown in FIG. 8, the mating sections 40 of the pins 36 enter the respective receptacles 92 by way of the holes 156 in the plate 152 of the insert 72, so that the leads 66 are connected to the diagnostic unit 8. The squibs 22 are not, however, connected in circuit until the parts 30 and 32 are closely proximate to their fully mated position which is shown in FIG. 8, when the chamfered ends 42 of the mating sections 40 of each pair of inactive pins 38, each engage a respective abutment ear 142 of a respective link 70 so as further to resiliently depress the beam 132 thereof, whereby the contact surfaces 140 of the lugs 138 of that link 70 are disengaged from the receptacles 92. The squibs 22 are thereby armed and protected. Almost as soon as unmating of the parts 30 and 32 begins, the mating sections 40 of the pins 38 are withdrawn so that the beams 132 resile whereby, the contact surfaces 140 are again engaged with their respective terminals. Thus where the parts 30 and 32 are only partially mated, or unmated, the squibs 22 are still protected against accidental or fortuitous activation.

During the mating of the parts 30 and 32, the hood 44 enters the recess 84, the seal 68 being received in the recess 61 of the hood 44, the key 58 enters the keyway 128 and the ribs 52 and 54 enter the channels 104. In the fully mated condition of the parts 30 and 32, each gap 53 coincides with the reduced width portion 111 of the respective channel 104, and the lugs 60 having cammed the beam 120 away from the block 84, each lie in a respective slot 126, latching against its shoulder 127. In order to lock the parts 30 and 32 in their fully mated condition, each arm 110 is depressed, for example under finger pressure, or by means of a suitable tool, so that the locking head 112 of the arm 110 is firmly wedged in the respective channel portion 111. Since each rib 54 lies behind the respective locking head 112, as shown in FIGS. 8 and 9, and since each arm 110 abuts the blind end 109 of the respective slot 108, the part 32 cannot be withdrawn from the part 30 unless the arms 110 are returned to their raised positions. Since the arms 110 can only be depressed when the parts 30 and 32 have been fully mated, the position of the arms 110 indicates, visually, whether or not the parts 30 and 32 have been fully mated, that is to say whether or not the squibs 22 are armed. If false latching of the parts 30 and 32 has occurred, the lugs 60 having jammed under the forward part of the yoke 122, the locking heads 112 cannot be inserted into the channel portions 111.

I claim:

1. A pair of matable electrical connector housings having means for locking them together in fully mated relationship, where said means for locking them together comprises a pair of longitudinally spaced locking ribs on one housing and a channel member on the other housing for receiving the locking ribs as the housings are being mated, the locking ribs projecting externally of a wall of a hood extending from a mating face of said one housing, the channel member being supported in spaced relationship with an external wall of said other housing so that the hood wall is receivable between the channel member and said external wall, the channel member having an opening for receiving a locking member flexibly connected to said other housing externally thereof, for snug reception between said locking ribs only in the fully mated condition of the housings, to lock them in their fully mated relationship, the channel member being joined to a yoke and supported by a gantry connected to a rear end of the housing, and by an outer wall partially surrounding the housing.

2. A pair of housings as claimed in claim 1, wherein the channel member defines a reduced width channel portion, in which the locking member is wedgable between the locking ribs.

3. A pair of housings as claimed in claim 2, wherein the locking member is of arrowhead-shaped cross-section and is elongated in the longitudinal direction of the channel member, to an extent substantially equal to the spacing between the locking ribs.

4. A pair of housings as claimed in claim 1, wherein the locking ribs project externally of a wall of a hood extending from a mating face of said one housing, the channel member being supported in spaced relationship with an external wall of said other housing so that the hood wall is receivable between the channel member and said external wall.

5. A pair of housings as claimed in claim 4, wherein a guide lug projects from said hood wall alongside one of the locking ribs, a resiliently deflectable yoke on said other housing defining a latching slot for receiving said lug, and being supported in spaced relationship with said external wall of said other housing to allow the hood wall to pass between the yoke and said external wall as the housings are being mated, the yoke being deflectable by said lug to allow said lug to latch against an end of said slot.

6. A pair of housings as claimed in claim 4, wherein the channel member and the yoke are supported by a gantry connected to a rear end of the housing, and by an outer wall partially surrounding the housing.

7. A pair of housings as claimed in claim 6, wherein said external wall is an upper wall of said housing, the locking member being connected to a lateral wall of the housing which is adjacent to said external wall, by means of a resilient arm which is flexible only towards and away from said opening of the channel member.

8. An electrical connector insulating housing comprising a plurality of terminal receiving cavities extending between a mating face and an opposite face of the housing, a pair of parallel, spaced, channel members supported in spaced relationship with respect to an external wall of the housing and extending from said mating face towards said opposite face, each channel member having laterally inner an outer side walls and a roof, cooperating to define a channel and having an open end side facing said external wall and an open end at least proximate to said mating face, the roof of each channel member having formed therein an opening which is spaced back from said mating face towards said opposite face, an end of said opening nearest to said mating face being blind, and locking wedge members each associated with a respective one of said channel members and each being connected to said housing between said mating and said opposite face thereof by means of an arm and each arm being capable of flexure to insert a locking member thereon through the opening of the channel member associated therewith, to wedge it in the channel thereof, the housing being partially surrounded by an outer wall, where a laterally outer wall of each channel member is connected to an edge of said housing outer wall and to a limb of a yoke resiliently supported in spaced relationship with respect to said external wall cooperating with a beam supporting the yoke to define a latching slot extending parallel to the channel member.

9. A housing as claimed in claim 8, wherein the housing is partially surrounded by an outer wall, the laterally outer wall of each channel member being connected to a respective edge of said outer wall and a limb of a yoke resiliently supported in spaced relationship with respect to said external wall cooperating with a beam supporting the yoke to define a latching slot extending parallel to the channel member.

10. A housing as claimed in claim 9, wherein the beam is supported by a gantry connected to that opposite wall of the housing and to the laterally outer wall of each channel member.

11. A housing as claimed in claim 9, wherein each arm is planar and is connected to said outer wall at its end remote from the wedge member thereon, the plane of each arm extending at right angles to said mating face.

* * * * *